US007551396B2

(12) United States Patent
Hsu et al.

(10) Patent No.: US 7,551,396 B2
(45) Date of Patent: Jun. 23, 2009

(54) PERPENDICULAR MAGNETIC WRITE HEAD HAVING A STUDDED TRAILING SHIELD COMPATIBLE WITH READ/WRITE OFFSET

(75) Inventors: Yimin Hsu, Sunyvale, CA (US); Quang Le, San Jose, CA (US); Roger William Wood, Gilroy, CA (US)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 650 days.

(21) Appl. No.: 11/116,796

(22) Filed: Apr. 27, 2005

(65) Prior Publication Data

US 2006/0245109 A1  Nov. 2, 2006

(51) Int. Cl.
*G11B 5/147* (2006.01)

(52) U.S. Cl. .............................. 360/125.3; 360/125.02

(58) Field of Classification Search .............. 29/603.12; 360/125.01, 125.02–125.32
See application file for complete search history.

(56) References Cited

U.S. PATENT DOCUMENTS

| | | | | |
|---|---|---|---|---|
| 4,489,484 A | | 12/1984 | Lee | 29/603 |
| 4,656,546 A | * | 4/1987 | Mallory | 360/110 |
| 5,543,989 A | | 8/1996 | Westwood | 360/113 |
| 5,793,577 A | * | 8/1998 | Katz et al. | 360/125.34 |
| 6,722,018 B2 | * | 4/2004 | Santini | 29/603.12 |
| 6,785,953 B2 | * | 9/2004 | Santini | 29/603.14 |
| 6,954,340 B2 | * | 10/2005 | Shukh et al. | 360/317 |
| 7,002,775 B2 | * | 2/2006 | Hsu et al. | 360/125.03 |
| 7,042,682 B2 | * | 5/2006 | Hu et al. | 360/317 |
| 7,070,698 B2 | * | 7/2006 | Le | 216/22 |
| 7,120,988 B2 | * | 10/2006 | Le et al. | 29/603.07 |
| 7,140,095 B2 | * | 11/2006 | Matono | 29/603.15 |
| 7,228,619 B2 | * | 6/2007 | Le | 29/603.23 |
| 2002/0048126 A1 | | 4/2002 | Shimazawa | 360/320 |
| 2003/0021063 A1 | | 1/2003 | Kuroda et al. | 360/125 |
| 2003/0117749 A1 | | 6/2003 | Shukh et al. | 360/317 |
| 2004/0218312 A1 | | 11/2004 | Matono | 360/317 |
| 2005/0068665 A1 | | 3/2005 | Le et al. | 360/97.01 |

FOREIGN PATENT DOCUMENTS

| EP | 1503372 | 2/2005 |
|---|---|---|
| EP | 1522991 | 4/2005 |

OTHER PUBLICATIONS

Office Communication from EP Application No. 06004838.6-1232 mailed on Aug. 1, 2007.
Office Action from Chinese Patent Application No. 200610077134.9 Mailed Dec. 21, 2007.
E. Leung, M. Hayashi, R. Leung, K. Ino, N. Matono, S. Takahashi, M. Fujita, "Writer Performance Improvement in MR Head With Oversized Trailing Poles Technique," Magnetics, IEEE Transactions on, vol. 34, Issue 4, Jul. 1998.

* cited by examiner

*Primary Examiner*—William J Klimowicz
(74) *Attorney, Agent, or Firm*—Zilka-Kotab, PC

(57) ABSTRACT

A studded trailing shield design and method for manufacture thereof. The studded trailing shield design maintains critical spacing between the trailing shield and the write pole and also maintains critical spacing between the studded, trailing shield connecting structure, even in a head design having read and write elements that are not aligned with one another.

8 Claims, 19 Drawing Sheets

PERPENDICULAR MAGNETIC WRITE HEAD HAVING A STUDDED TRAILING SHIELD COMPATIBLE WITH READ/WRITE OFFSET

FIELD OF THE INVENTION

The present invention relates to perpendicular magnetic recording and more particularly to a novel trailing magnetic shield design and a method for manufacturing such a shield design.

BACKGROUND OF THE INVENTION

The heart of a computer's long term memory is an assembly that is referred to as a magnetic disk drive. The magnetic disk drive includes a rotating magnetic disk, write and read heads that are suspended by a suspension arm adjacent to a surface of the rotating magnetic disk and an actuator that swings the suspension arm to place the read and write heads over selected circular tracks on the rotating disk. The read and write heads are directly located on a slider that has an air bearing surface (ABS). The suspension arm biases the slider toward the surface of the disk, and when the disk rotates, air adjacent to the disk moves along with the surface of the disk. The slider flies over the surface of the disk on a cushion of this moving air. When the slider rides on the air bearing, the write and read heads are employed for writing magnetic transitions to and reading magnetic transitions from the rotating disk. The read and write heads are connected to processing circuitry that operates according to a computer program to implement the writing and reading functions.

The write head traditionally includes a coil layer embedded in first, second and third insulation layers (insulation stack), the insulation stack being sandwiched between first and second pole piece layers. A gap is formed between the first and second pole piece layers by a gap layer at an air bearing surface (ABS) of the write head and the pole piece layers are connected at a back gap. Current conducted to the coil layer induces a magnetic flux in the pole pieces which causes a magnetic field to fringe out at a write gap at the ABS for the purpose of writing the aforementioned magnetic transitions in tracks on the moving media, such as in circular tracks on the aforementioned rotating disk.

In recent read head designs a spin valve sensor, also referred to as a giant magnetoresistive (GMR) sensor, has been employed for sensing magnetic fields from the rotating magnetic disk. The sensor includes a nonmagnetic conductive layer, hereinafter referred to as a spacer layer, sandwiched between first and second ferromagnetic layers, hereinafter referred to as a pinned layer and a free layer. First and second leads are connected to the spin valve sensor for conducting a sense current therethrough. The magnetization of the pinned layer is pinned perpendicular to the air bearing surface (ABS) and the magnetic moment of the free layer is located parallel to the ABS, but free to rotate in response to external magnetic fields. The magnetization of the pinned layer is typically pinned by exchange coupling with an antiferromagnetic layer.

The thickness of the spacer layer is chosen to be less than the mean free path of conduction electrons through the sensor. With this arrangement, a portion of the conduction electrons is scattered by the interfaces of the spacer layer with each of the pinned and free layers. When the magnetizations of the pinned and free layers are parallel with respect to one another, scattering is minimal and when the magnetizations of the pinned and free layer are antiparallel, scattering is maximized. Changes in scattering alter the resistance of the spin valve sensor in proportion to cos $\theta$, where $\theta$ is the angle between the magnetizations of the pinned and free layers. In a read mode the resistance of the spin valve sensor changes proportionally to the magnitudes of the magnetic fields from the rotating disk. When a sense current is conducted through the spin valve sensor, resistance changes cause potential changes that are detected and processed as playback signals.

When a spin valve sensor employs a single pinned layer it is referred to as a simple spin valve. When a spin valve employs an antiparallel (AP) pinned layer it is referred to as an AP pinned spin valve. An AP spin valve includes first and second magnetic layers separated by a thin non-magnetic coupling layer such as Ru. The thickness of the spacer layer is chosen so as to be antiparallel coupled to the magnetizations of the ferromagnetic layers of the pinned layer. A spin valve is also known as a top or bottom spin valve depending upon whether the pinning layer is at the top (formed after the free layer) or at the bottom (before the free layer).

The spin valve sensor is located between first and second nonmagnetic electrically insulating read gap layers and the first and second read gap layers are located between ferromagnetic first and second shield layers. In a merged magnetic head a single ferromagnetic layer functions as the second shield layer of the read head and as the first pole piece layer of the write head. In a piggyback head the second shield layer and the first pole piece layer are separate layers.

Magnetization of the pinned layer is usually fixed by exchange coupling one of the ferromagnetic layers (API) with a layer of antiferromagnetic material such as PtMn. While an antiferromagnetic (AFM) material such as PtMn does not in and of itself have a magnetization, when exchange coupled with a magnetic material, it can strongly pin the magnetization of the ferromagnetic layer.

In order to meet the ever increasing demand for improved data rate and data capacity, researchers have recently been focusing their efforts on the development of perpendicular recording systems. A traditional longitudinal recording system, such as one that incorporates the write head described above, stores data as magnetic bits oriented longitudinally along a track in the plane of the surface of the magnetic disk. This longitudinal data bit is recorded by a fringing field that forms between the pair of magnetic poles separated by a write gap.

A perpendicular recording system, by contrast, records data as magnetization oriented perpendicular to the plane of the magnetic disk. The magnetic disk has a magnetically soft underlayer covered by a thin magnetically hard top layer. The perpendicular write head has a write pole with a very small cross section and a return pole having a much larger cross section. A strong, highly concentrated magnetic field emits from the write pole in a direction perpendicular to the magnetic disk surface, magnetizing the magnetically hard top layer. The resulting magnetic flux then travels through the soft underlayer, returning to the return pole where it is sufficiently spread out and weak that it will not erase the signal recorded by the write pole when it passes back through the magnetically hard top layer on its way back to the return pole.

One of the features of perpendicular recording systems is that the high coercivity top layer of the magnetic medium has a high switching field. This means that a strong magnetic field is needed to switch the magnetic moment of the medium when writing a magnetic bit of data. In order to decrease the switching field and increase recording speed, attempts have been made to angle or "cant" the write field being emitted from the write pole. Canting the write field at an angle relative to the normal of the medium makes the magnetic moment of the medium easier to switch by reducing the switching field.

Modeling has shown that a single pole writer in a perpendicular recording system can exhibit improved transition sharpness (ie. better field gradient and resolution), achieve better media signal to noise ratio, and permit higher coercive field media for higher areal density magnetic recording if, according to the Stoner-Wohlfarth model for a single particle, the effective flux field is angled. A method that has been investigated to cant the magnetic field has been to provide a trailing magnetic shield adjacent to the write head, to magnetically attract the field from the write pole.

The trailing shield can be a floating design, in that the magnetic trailing shield is not directly, magnetically connected with the other structures of the write head. Magnetic field from the write pole results in a flux in the shield that essentially travels through the magnetic medium back to the return pole of the write head. Various dimensions of the shield are critical for the floating trailing shield to operate correctly. For instance, effective angling or canting of the effective flux field is optimized when the write pole to trailing shield separation (gap) is about equal to the head to soft underlayer spacing (HUS) and the trailing shield throat height is roughly equal to half the track-width of the write pole. This design improves write field gradient at the expense of effective flux field. To minimize effective flux field lost to the trailing shield and still achieve the desired effect, the gap and shield thickness are adjusted to minimize saturation at the shield and effective flux field lost to the shield respectively.

A problem that associated with floating trailing shield designs is that the flux shunted to the return pole through the magnetic medium tends to cause saturation of the return pole at the ABS. When the flux is shunted to the return pole through the magnetic medium, it is combined with the desired flux from the write pole, which also flows through the magnetic medium.

One way to overcome this would be to directly magnetically couple the trailing shield to the return pole rather than relying on the magnetic medium to conduct the flux to the return pole. Constructing such a direct magnetic connection from the trailing shield to the return pole is challenging, however, due in large part to the large distance between the trailing shield and the return pole. In addition, in many designs the read sensor and write pole are not aligned, and in such designs the return pole also may not be aligned with the write pole. The challenge presented by such designs is construct a connecting structure that can provide a desired spacing from the write pole, while also connecting to the non-aligned return pole.

Therefore, there is a strong felt need for a practical, manufacturable trailing shield design that provides direct magnetic connection with the return pole. Such a trailing shield would preferably be usable in a magnetic head design in which the read head and write head are not aligned.

SUMMARY OF THE INVENTION

The present invention provides a magnetic write head having a trailing magnetic shield for use in perpendicular magnetic data recording. The write head includes a return pole and a write pole. A magnetic pedestal is connected with a front ABS end of the return pole and extends toward the write pole. First and second magnetic studs extend from laterally opposed ends of the return pole. A trailing shield extends from one of the studs to the other and is separated from the write pole by a non-magnetic, electrically conductive seed layer that also acts as trailing shield gap layer.

The writer and trailing shield design can advantageously be used in a magnetic head in which the magnetoresistive read sensor is laterally misaligned with the write pole of the write head. In a possible embodiment of the invention, the return pole and the pedestal can be laterally aligned with the read sensor, while the studs, write pole and the trailing shield can be laterally aligned with one another, but not laterally aligned with the read sensor, return pole and pedestal.

The first and second studs can be notched at their laterally inward ends to provide exceptional control of spacing between the write pole and the stud structure. The notches result in laterally outwardly disposed upward extending unnotched portions. Third and fourth studs, which may be integral with the trailing shield itself and may be deposited in the same deposition step, may connect with the upper surfaces of these upward extending portions of the first and second studs.

The present invention, therefore, provides a trailing shield design, which also provides magnetic shielding completely surrounding the write while also maintaining a desired separation from surrounding shield. The stud and pedestal portions of the structure provide excellent magnetic shielding to protect an adjacent magnetic medium from field such as from the shaping layer or the write coil.

These and other features and advantages of the invention will be apparent upon reading of the following detailed description of preferred embodiments taken in conjunction with the Figures in which like reference numerals indicate like elements throughout.

BRIEF DESCRIPTION OF THE DRAWINGS

For a fuller understanding of the nature and advantages of this invention, as well as the preferred mode of use, reference should be made to the following detailed description read in conjunction with the accompanying drawings which are not to scale.

DETAILED DESCRIPTION OF THE PREFERRED EMBODIMENTS

The following description is of the best embodiments presently contemplated for carrying out this invention. This description is made for the purpose of illustrating the general principles of this invention and is not meant to limit the inventive concepts claimed herein.

Figure 1:
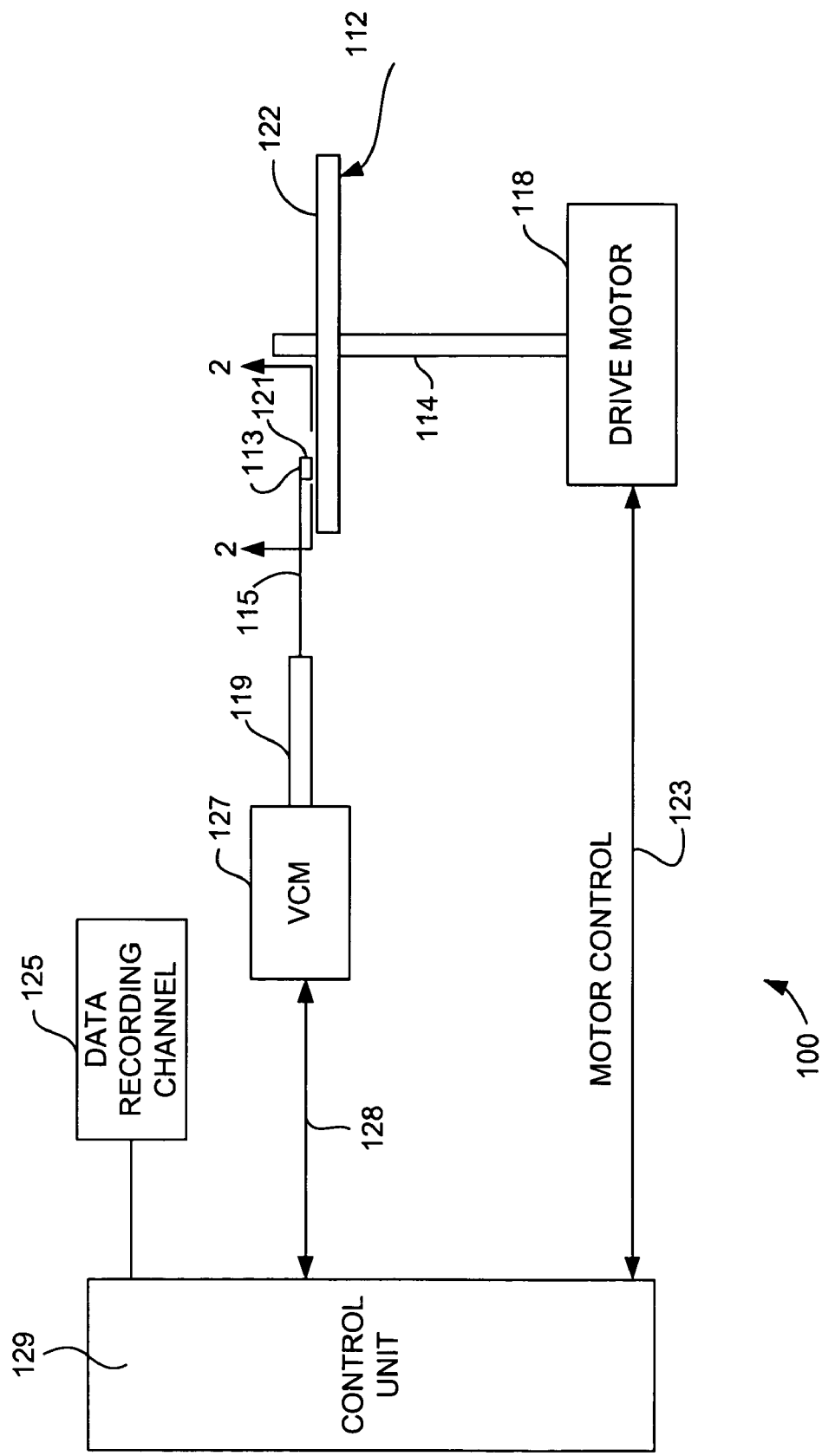
FIG. 1 is a schematic illustration of a disk drive system in which the invention might be embodied.

Referring now to FIG. 1, there is shown a disk drive 100 embodying this invention. As shown in FIG. 1, at least one rotatable magnetic disk 112 is supported on a spindle 114 and rotated by a disk drive motor 118. The magnetic recording on each disk is in the form of annular patterns of concentric data tracks (not shown) on the magnetic disk 112.

At least one slider 113 is positioned near the magnetic disk 112, each slider 113 supporting one or more magnetic head assemblies 221. As the magnetic disk rotates, slider 113 moves radially in and out over the disk surface 122 so that the magnetic head assembly 121 may access different tracks of the magnetic disk where desired data are written. Each slider 113 is attached to an actuator arm 119 by way of a suspension 115. The suspension 115 provides a slight spring force which biases slider 113 against the disk surface 122. Each actuator arm 119 is attached to an actuator means 127. The actuator means 127 as shown in FIG. 1 may be a voice coil motor (VCM). The VCM comprises a coil movable within a fixed magnetic field, the direction and speed of the coil movements being controlled by the motor current signals supplied by controller 129.

During operation of the disk storage system, the rotation of the magnetic disk 112 generates an air bearing between the slider 113 and the disk surface 122 which exerts an upward force or lift on the slider. The air bearing thus counter-balances the slight spring force of suspension 115 and supports slider 113 off and slightly above the disk surface by a small, substantially constant spacing during normal operation.

The various components of the disk storage system are controlled in operation by control signals generated by control unit 129, such as access control signals and internal clock signals. Typically, the control unit 129 comprises logic control circuits, storage means and a microprocessor. The control unit 129 generates control signals to control various system operations such as drive motor control signals on line 123 and head position and seek control signals on line 128. The control signals on line 128 provide the desired current profiles to optimally move and position slider 113 to the desired data track on disk 112. Write and read signals are communicated to and from write and read heads 121 by way of recording channel 125.

Figure 2:
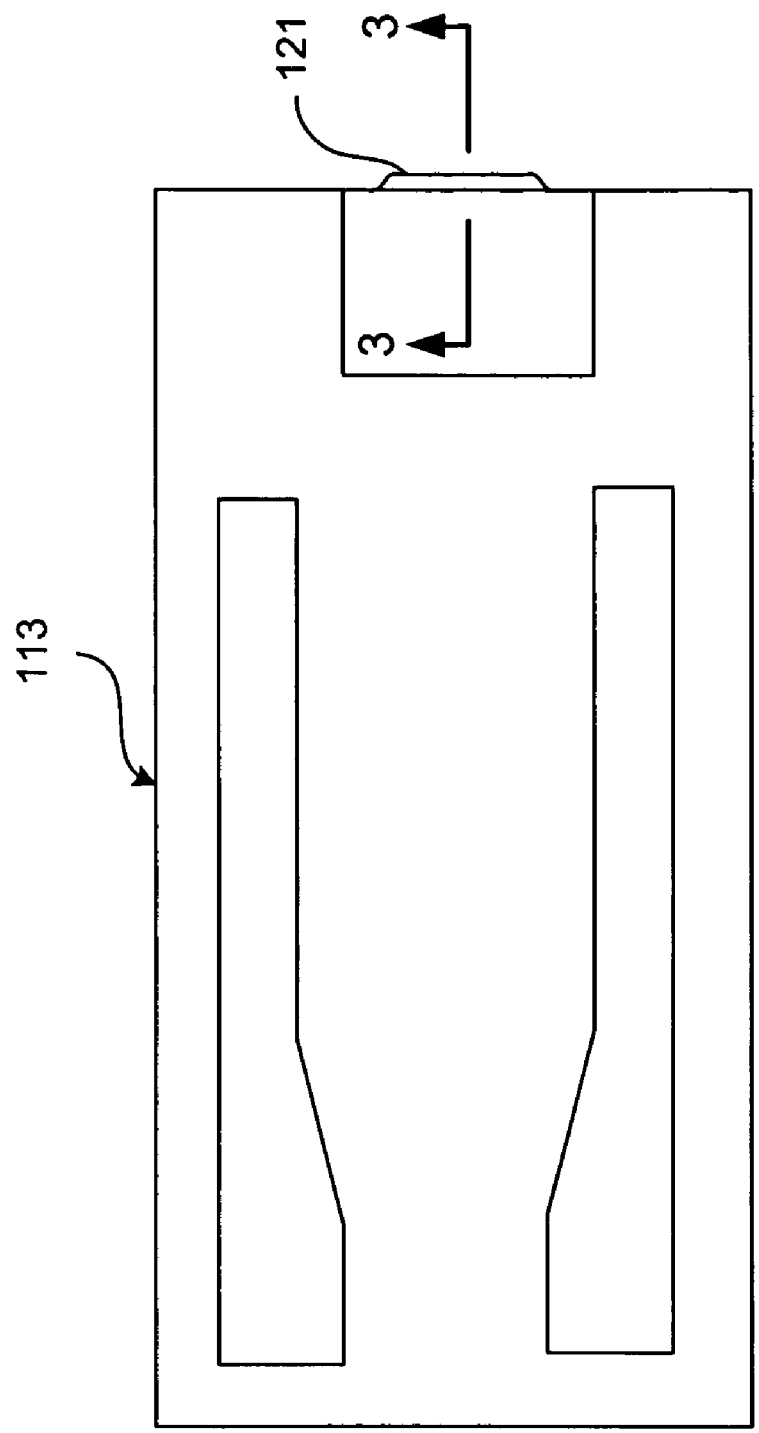
FIG. 2 is an ABS view of a slider, taken from line 2-2 of FIG. 1, illustrating the location of a magnetic head thereon.

With reference to FIG. 2, the orientation of the magnetic head 121 in a slider 113 can be seen in more detail. FIG. 2 is an ABS view of the slider 113, and as can be seen the magnetic head including an inductive write head and a read sensor, is located at a trailing edge of the slider. The above description of a typical magnetic disk storage system, and the accompanying illustration of FIG. 1 are for representation purposes only. It should be apparent that disk storage systems may contain a large number of disks and actuators, and each actuator may support a number of sliders.

Figure 3:
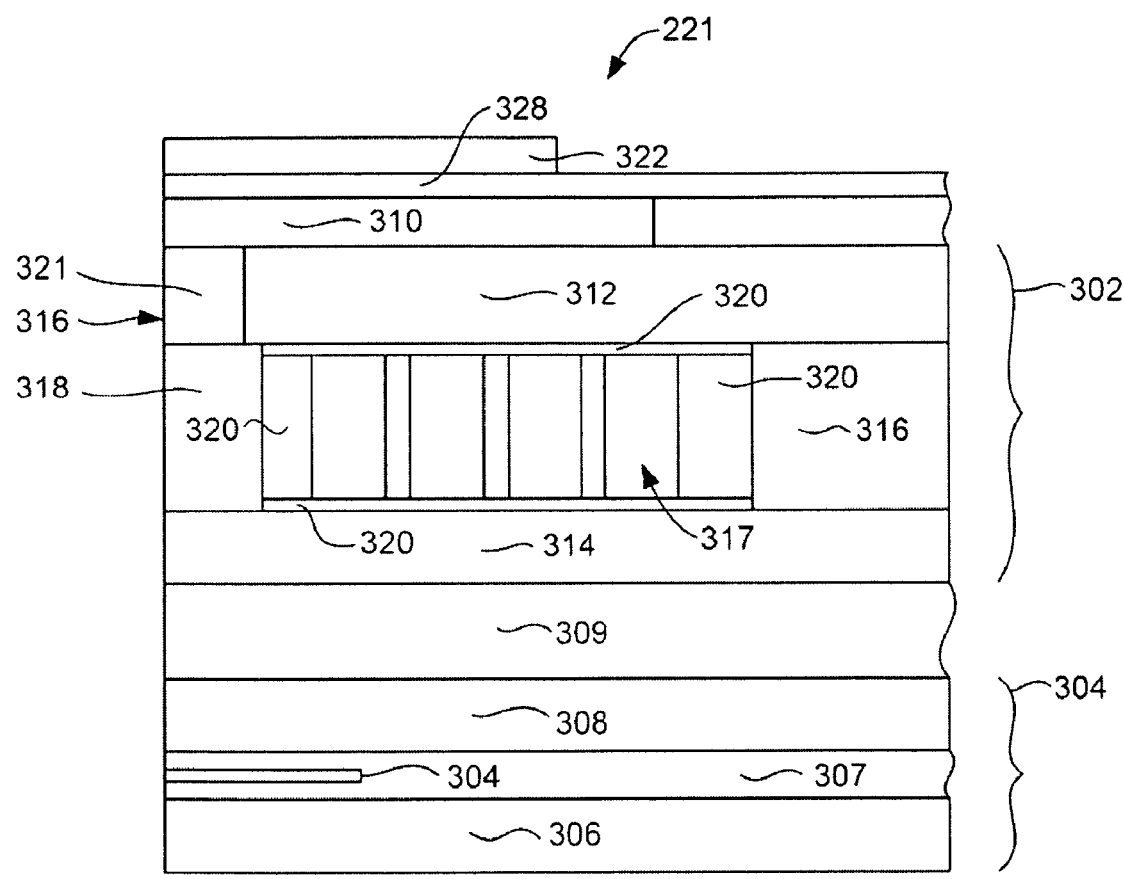
FIG. 3 is a cross sectional view, taken from line 3-3 of FIG. 2 and rotated 90 degrees counterclockwise, of a magnetic head according to an embodiment of the present invention.

With reference now to FIG. 3, the magnetic head 221 for use in a perpendicular magnetic recording system is described. The head 221 includes a write element 302 and a read sensor 304. The read sensor is preferably a giant magnetoresistive (GMR) sensor and is preferably a current perpendicular to plane (CPP) GMR sensor. CPP GMR sensors are particularly well suited for use in perpendicular recording systems. However, the sensor 304 could be another type of sensor such as a current in plane (CIP) GMR sensor or, a tunnel junction sensor (TMR) or some other type of sensor. The sensor 304 is located between and insulated from first and second magnetic shields 306, 308 and embedded in a dielectric material 307. The magnetic shields, which can be constructed of for example CoFe or NiFe, absorb magnetic fields, such as those from uptrack or down track data signals, ensuring that the read sensor 304 only detects the desired data track located between the shields 306, 308. A non-magnetic, electrically insulating gap layer 309 may be provided between the shield 308 and the write head 302.

With continued reference to FIG. 3, the write element 302 includes a write pole 310, that is magnetically connected with a magnetic shaping layer 312, and is embedded within an insulation material 311 (FIG. 4) near the ABS. The write pole has a small cross section at the air bearing surface and is constructed of a material having a high saturation moment, such as FeNi or CoFe. The shaping layer 312 is constructed of a magnetic material such as CoFe or NiFe and has a cross section parallel to the ABS surface that is significantly larger than that of the write pole 310.

The write element 302 also has a return pole 314 that preferably has a surface exposed at the ABS surface and has a cross section parallel with the ABS surface that is much larger than that of the write pole 310. The return pole 314 is magnetically connected with the shaping layer 312 by a back gap portion 316. The return pole 314 and back gap 316 can be constructed of, for example, NiFe, CoFe or some other magnetic material.

An electrically conductive write coil 317, shown in cross section in FIG. 3, passes through the write element 302 between the shaping layer 312, and the return pole 314. The write coil 317 is surrounded by an electrically insulating material 320 that electrically insulates the turns of the coil 317 from one another and electrically isolates the coil 317 from the surrounding magnetic structures 310, 312, 316, 314. When a current passes through the coil 317, the resulting magnetic field causes a magnetic flux to flow through the return pole 314, back gap 316, shaping layer 312 and write pole 310. This magnetic flux causes a write field to be emitted toward an adjacent magnetic medium.

The write head element 302 also includes a trailing shield 322. The trailing shield 322 is connected to the return pole 314 by a pedestal connector structure 316 that can be understood more clearly with reference to FIG. 4. The connector structure, referred to generally as 316 in FIG. 4, includes a pedestal 318 formed at a first elevation, first and second stud portions 321, 322 formed at a second elevation above the first elevation, and third and fourth stud portions 324, 326 formed at a third elevation above the second elevation.

The pedestal portion is formed generally at the elevation of the coil 317, but may extend slightly below the bottom of the coil 317 and slight above the top of the coil 317 to account for insulation layers 320 at the top and bottom of the coil 317. The first and second stud portions 321, 322 cannot be seen in FIG. 3, because they are located into the plane of the page. The first and second stud portions 321, 322 are preferably at the same level as the shaping layer 312, preferably having bottom surfaces that are coplanar with the bottom surfaces of the shaping layer 312 and having top surfaces that are coplanar with the top surface of the shaping layer 312. The top surfaces of the first and second stud portions 321, 322 are also coplanar with the bottom surface of the write pole 310. The top surfaces of the third and fourth stud portions 324, 326 are magnetically connected with the trailing edge shield and may be integral therewith.

A non-magnetic, electrically conductive seed layer 328, which also serves as a trailing edge gap, is disposed between the trailing edge shield 322 and the write pole 310. The gap layer 328 can be for example Rh or some other suitable material, and because it is deposited on a smooth planar surface and can be left intact in the finished head (as will be described in further detail herein below) it can vary precisely define the gap distance between the write pole 310 and the trailing shield 322.

The return pole 314, back gap 316, shaping layer 312, as well as all of the pedestal 318, stud portions 321, 322, 324, 326, and the trailing shield can all be constructed of a magnetic material that is capable of being electroplated, such as for example NiFe.

Figure 4:
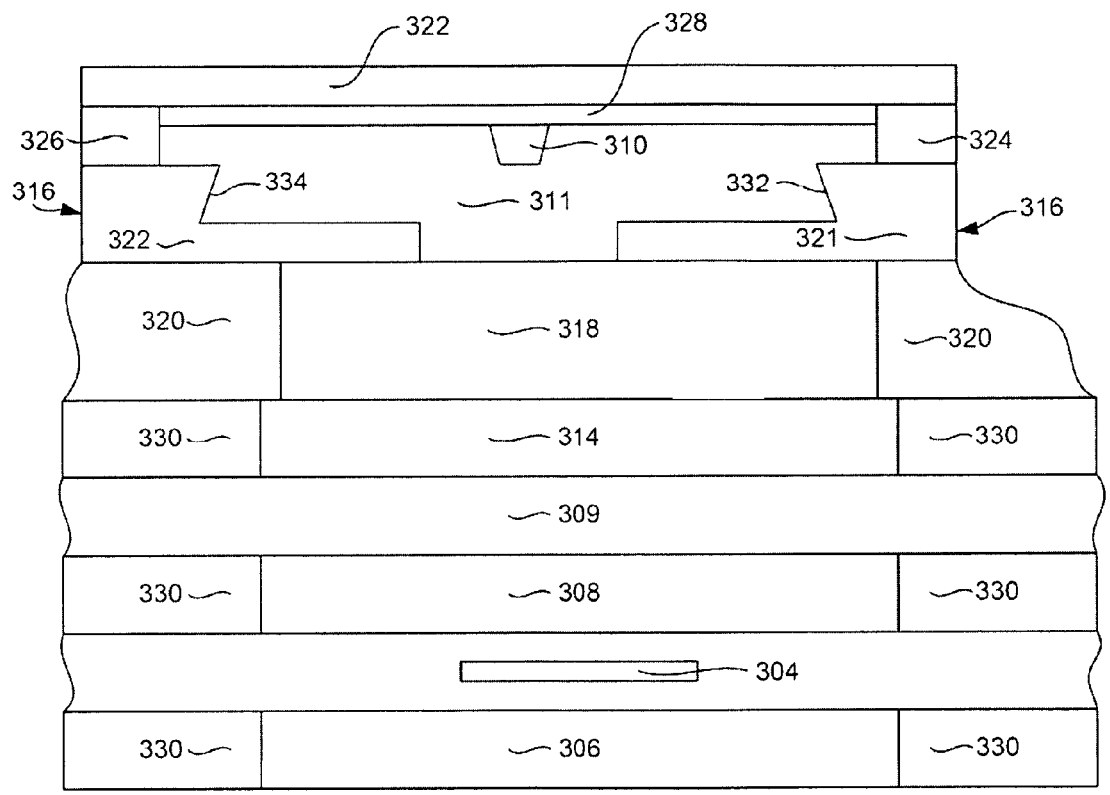
FIG. 4 is an ABS view taken from line 4-4 of FIG. 3 and enlarged.

With reference to FIG. 4, the shields 306, 308 and the return pole 314 may all be constructed having outer portions 330 that are recessed from the ABS. Such recessed outer wing portions have been found to prevent stray field writing, which can occur when magnetic charges accumulate at the corners of a magnetic structure.

With reference still to FIG. 4, the first and second studs 321, 322 have notches 332, 334 which ensure a desired amount of spacing is maintained between the studs 321, 322 and the write pole 310. Also, it can be seen that, while the return pole 314 is aligned with the read sensor 304, the write pole 310 as well as the trailing shield 322 and all of the trailing shield connecting pedestal structure 316 (which includes the pedestal 318 and studs 321, 322, 324 and 326) are aligned with one another, but not with the read sensor 304. This advantageously allows a desired critical spacing to be maintained between the write pole 310 and the trailing shield 322 and connecting structure 316.

It can be seen that the write pole 310 is completely surrounded by magnetic shielding material 322, 316. This advantageously shields the adjacent magnetic medium in the area around the write pole 310, preventing the magnetic medium in that area from being affected by magnetic fields such as from the coil 317, shaping layer 312, or the environment. The reason that the spacing between the connecting structure 316 and the write pole 310 is important is that if the spacing is too large, the shielding effect of this structure will be less than optimal. However, if the spacing is too small, flux will leak from the write pole 310 to the trailing shield connecting structure 316. It should also be pointed out that the write pole 310, which can be a high Bsat material such as CoFe or $NiFe_{50}$, is set within a dielectric material, such as Alumina $Al_2O_3$, which is provided beneath and beside the write pole 310.

Figure 5:
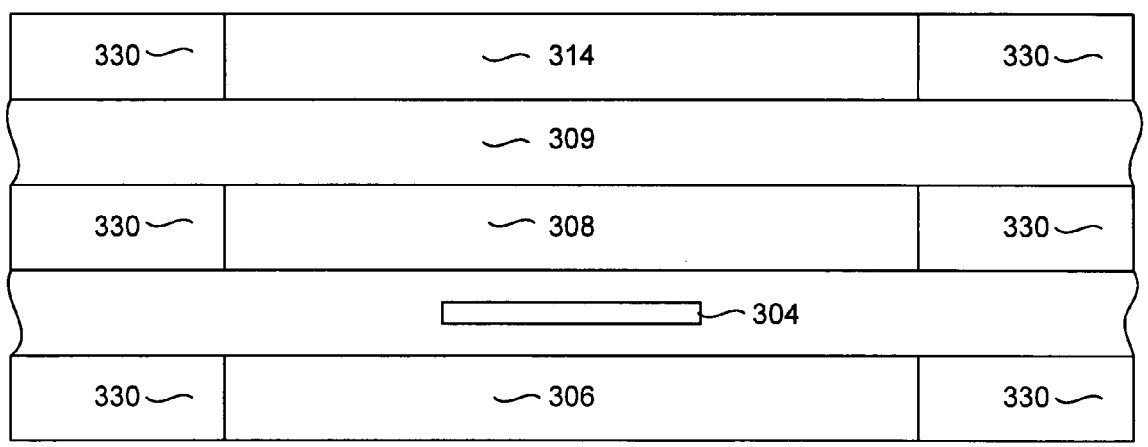
FIGS. 5-18 are ABS views similar to that of FIG. 4, showing a magnetic head in various intermediate stages of manufacture and illustrating a method of manufacturing a magnetic head according to an embodiment of the invention.
Figure 6:
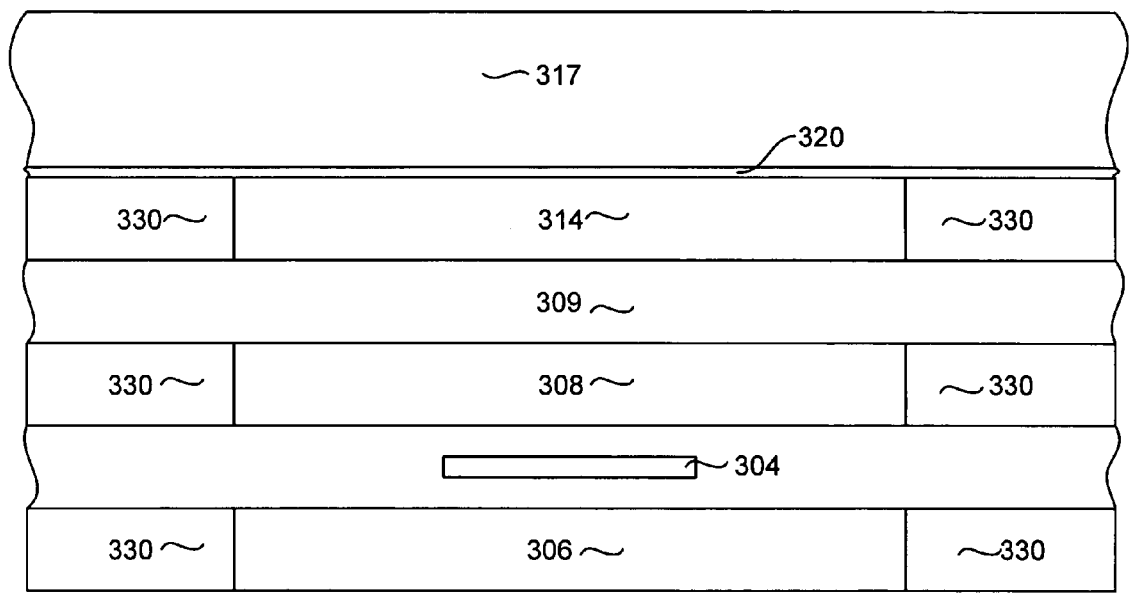
Figure 7:
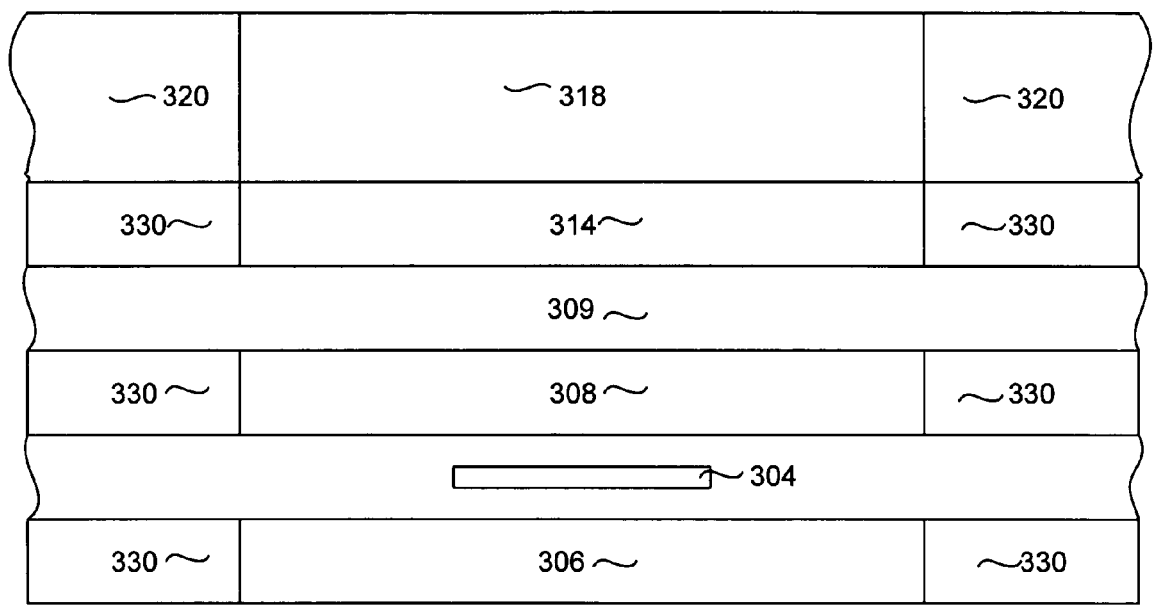

With reference now to FIGS. 5-16 a method for constructing a magnetic 221 according to an embodiment of the invention is described. With particular reference to FIG. 5, the read sensor 304, shields 306, 308 insulation layer 309 and return pole 314 are constructed using photolithographic methods and deposition methods that will be familiar to those skilled in the art. Thereafter, with reference to FIG. 6, the coil 317 is constructed. The construction of the coil may can be performed by methods familiar to those skilled in the art, such as forming a photoresist frame and plating a coil of, for example Cu. The coil 317 may also be constructed by a damascene method. Then with reference to FIG. 7, the pedestal 318 can be constructed. The pedestal 318 can be for example NiFe and can be constructed by forming a photoresist frame, sputter depositing an electrically conductive seed layer and then electroplating the pedestal 318. It should be noted at this point that the pedestal 318 can be laterally aligned with the return pole 314 and the read sensor 304. The term "laterally" as used herein refers to a direction that is parallel with the ABS and perpendicular to the data track direction (ie. from one side to the other as the various layers are deposited). After the pedestal 318 has been constructed a layer of dielectric material such as $Al_2O_3$ can be deposited to form the insulation layer 320. A chemical mechanical polishing process (CMP) can be performed to form a smooth planar surface across the top of the pedestal 318, and the insulation layer 320.

Figure 8:
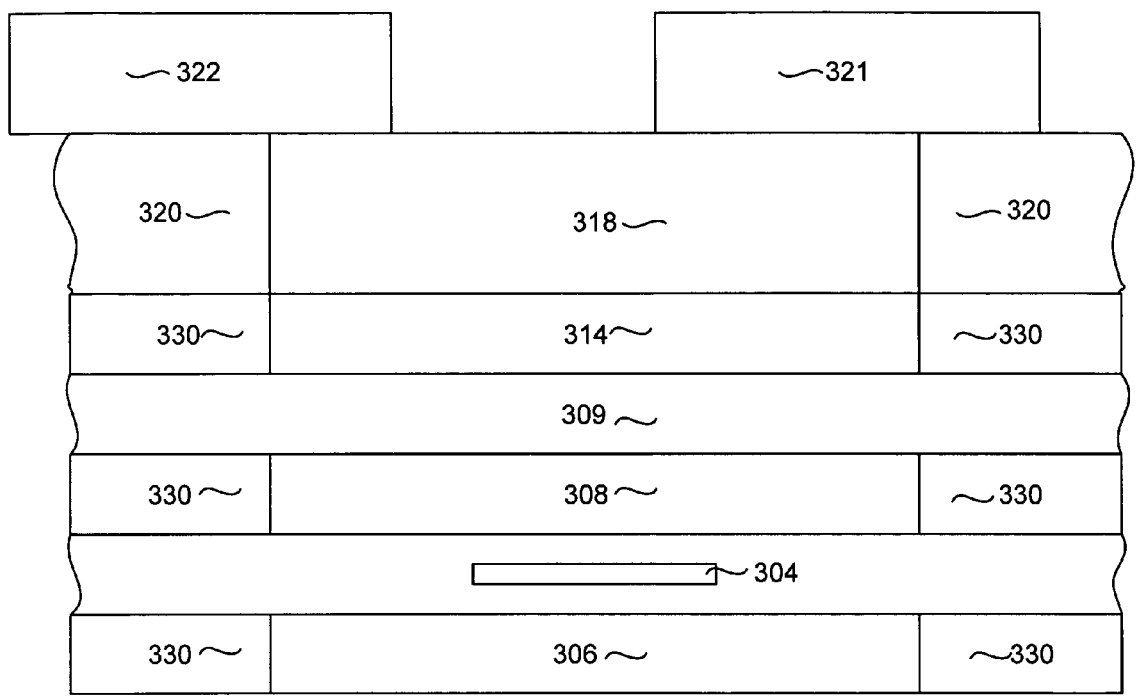
Figure 9:
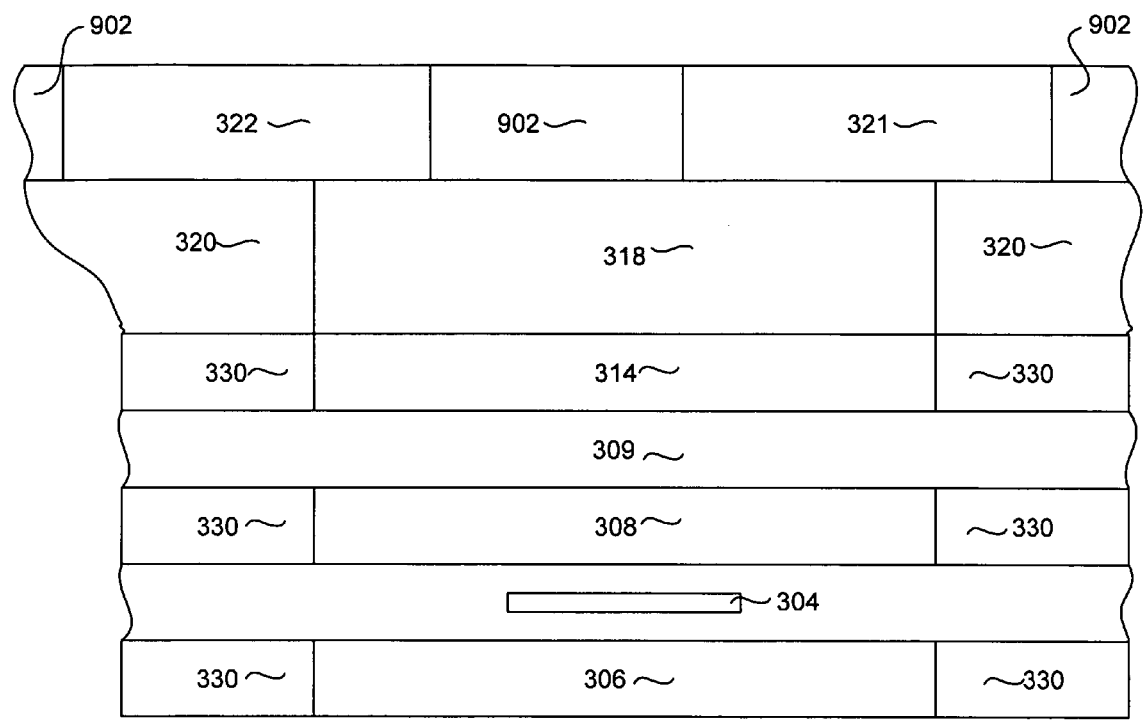
Figure 10:
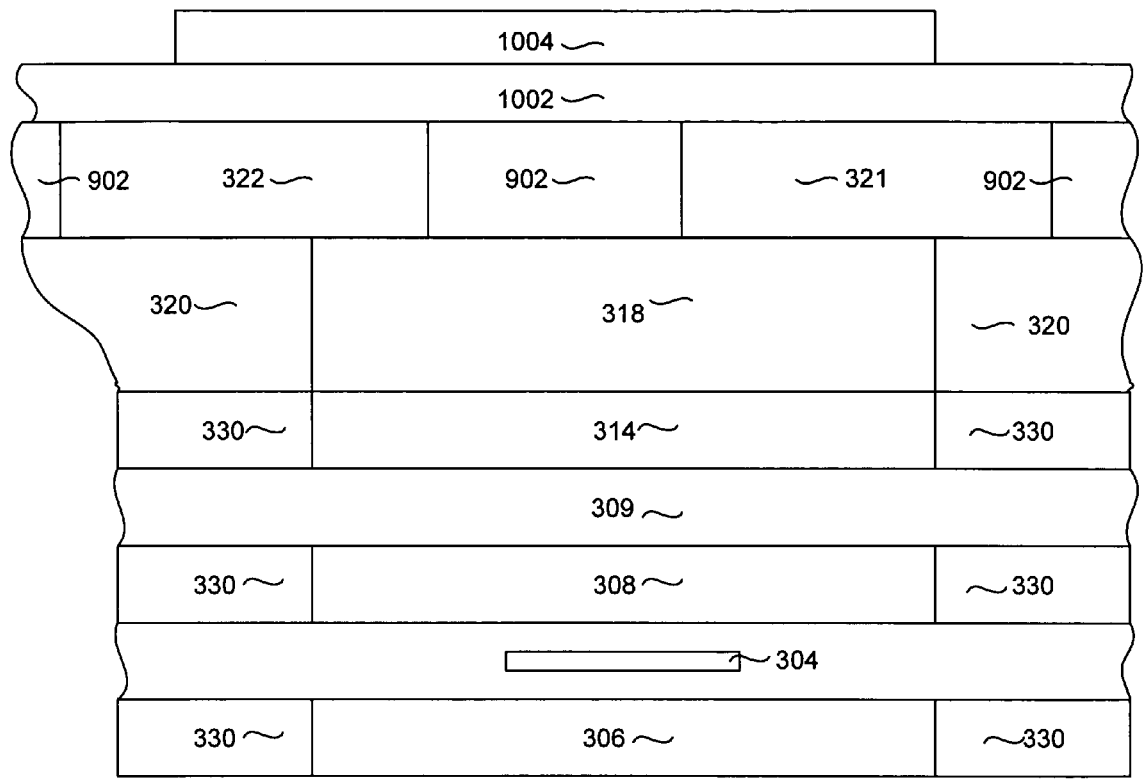
Figure 11:
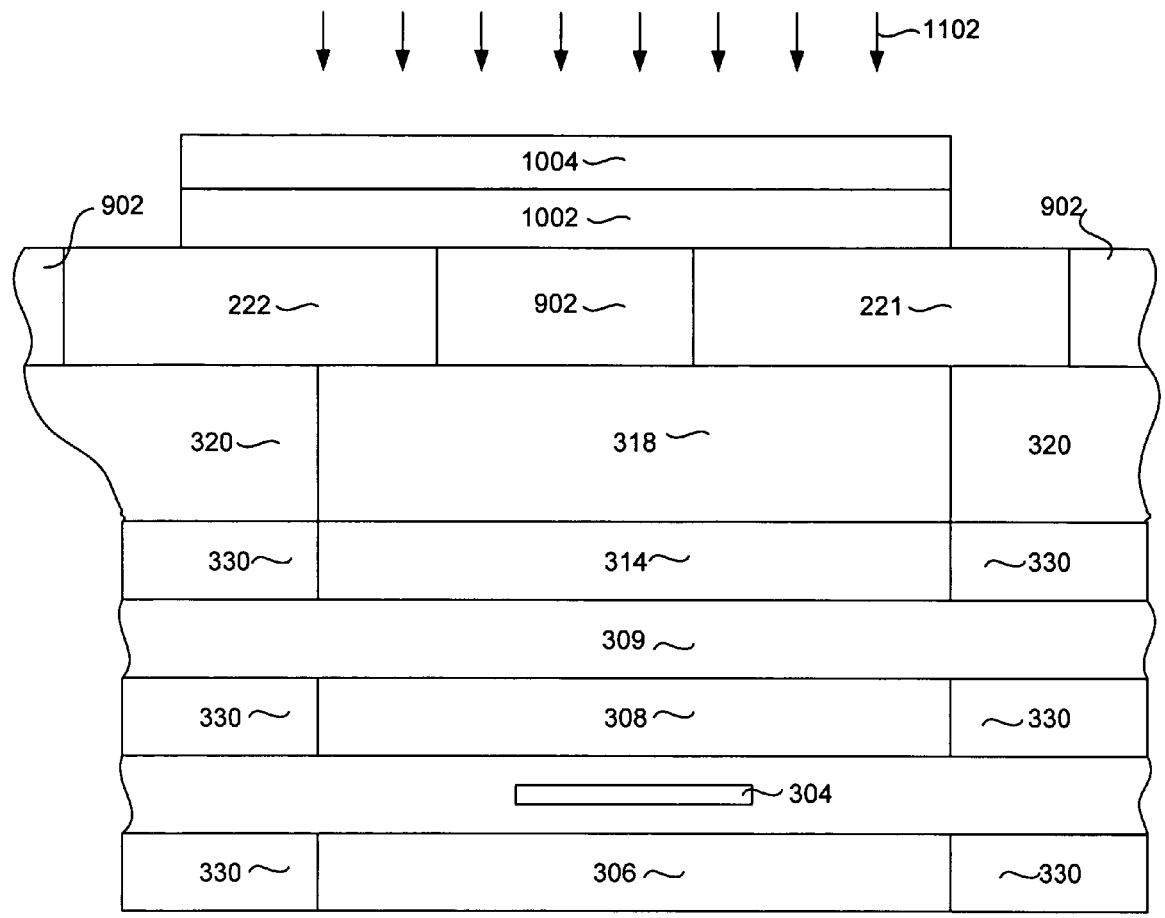

With reference now to FIG. 8, the first and second stud portions 321, 322 are formed using a combination of photolithography and electroplating. A seed layer may need to be deposited too. Note that the stud portions 321, 322 may be laterally out of alignment with the pedestal 318, return pole 314 and read sensor 304. With reference now to FIG. 9, a dielectric material 902 such as $Al_2O_3$ is deposited and a chemical mechanical polishing process (CMP) performed to create a smooth, coplanar surface across the stud portions 321, 322 and the dielectric layer 902. Then, with reference to FIG. 10, a layer of write pole material 1002 is deposited. This material may be a single layer of high Bsat material such as CoFe or $NiFe_{50}$, or could also be constructed as multiple laminated layers of magnetic material separated by very thin layers of non-magnetic material. A photoresist mask 1004 is then formed over the write pole material 1002. The photoresist mask 1004 is formed to cover only a portion of the stud portions 321, 322 and also to cover the space between the stud portions 321, 322, leaving portions of the stud portions 321, 322 to extend laterally beyond the edges of the photoresist mask 1004. Thereafter, with reference to FIG. 11, a material removal process 1102, such as ion beam etching (IBE). is performed to remove portions of the write pole material 1002 that are not covered by the photoresist mask 1004. This material removal process 1102 is performed sufficiently to expose the portions of the studs 321, 322 that are not covered by the photoresist mask 1004. In addition the material removal process 1102 is performed sufficiently to open up alignment marks (not shown).

Figure 12:
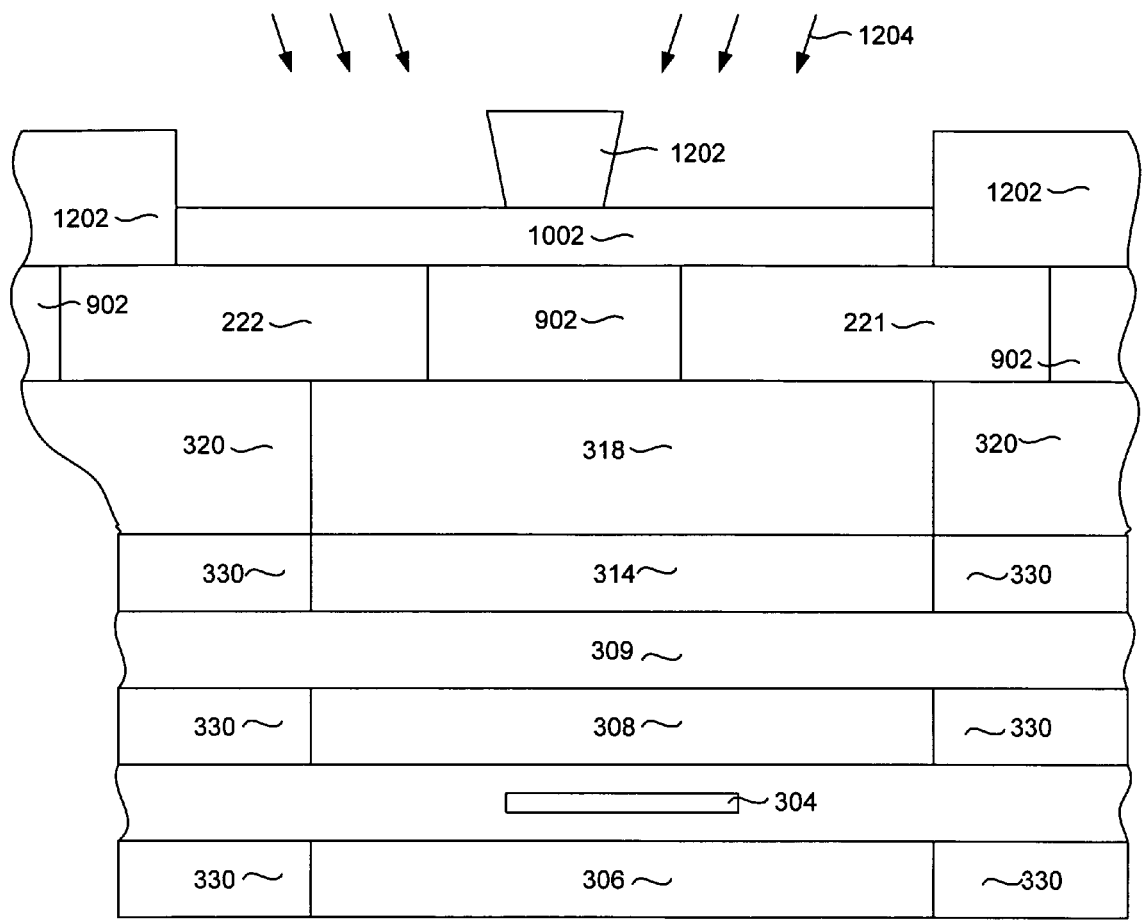

With reference now to FIG. 12, the first photoresist mask 1004 is removed. A hard mask 1202 is then formed. The hard mask 1202 can include for example diamond like carbon (DLC) Duramide $SiO_2$ or Tis. The hard mask 1202 is formed to cover the area where the write pole 310 is desired to be and to also cover the areas not covered by the remaining write pole material 1002, including the previously exposed portions of the studs 321, 322. An ion mill 1204 is then performed to remove portions of the write pole material 1002 that are not protected by the hard mask 1202. The ion mill 1204 is preferably performed at angle, to form a write pole 302 with a desired trapezoidal shape as viewed from the ABS. The ion mill 1204 can also be performed sufficiently to remove a desired amount of material from the studs 321, 322 in the areas not covered by the hard mask 1202.

Figure 13:
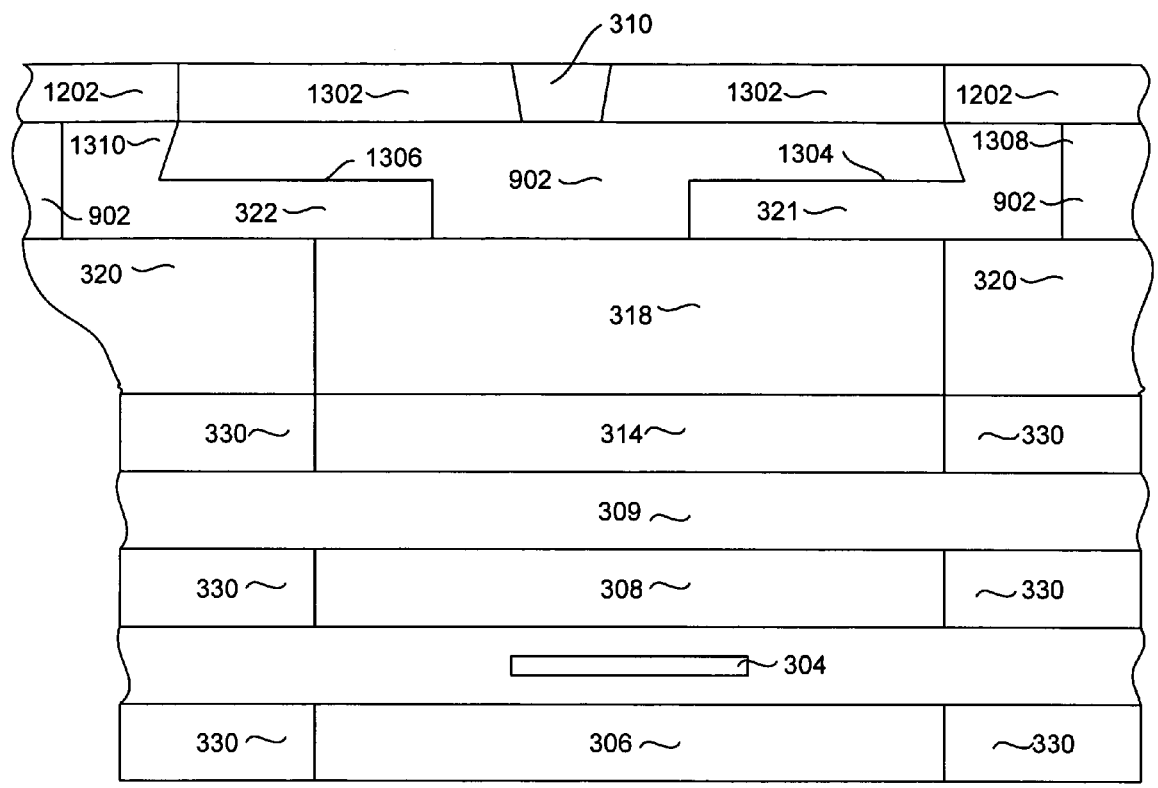

With reference to FIG. 13, a dielectric material 1302 such as alumina $Al_2O_3$ can be deposited and a CMP performed to expose the top of the write pole 310. It can be seen that the ion mill 1204 performed with reference to FIG. 12 removed a portion of the studs 321, 322 to form notches 1304, 1306 and raised outer portions 1308, 1310.

Figure 14:
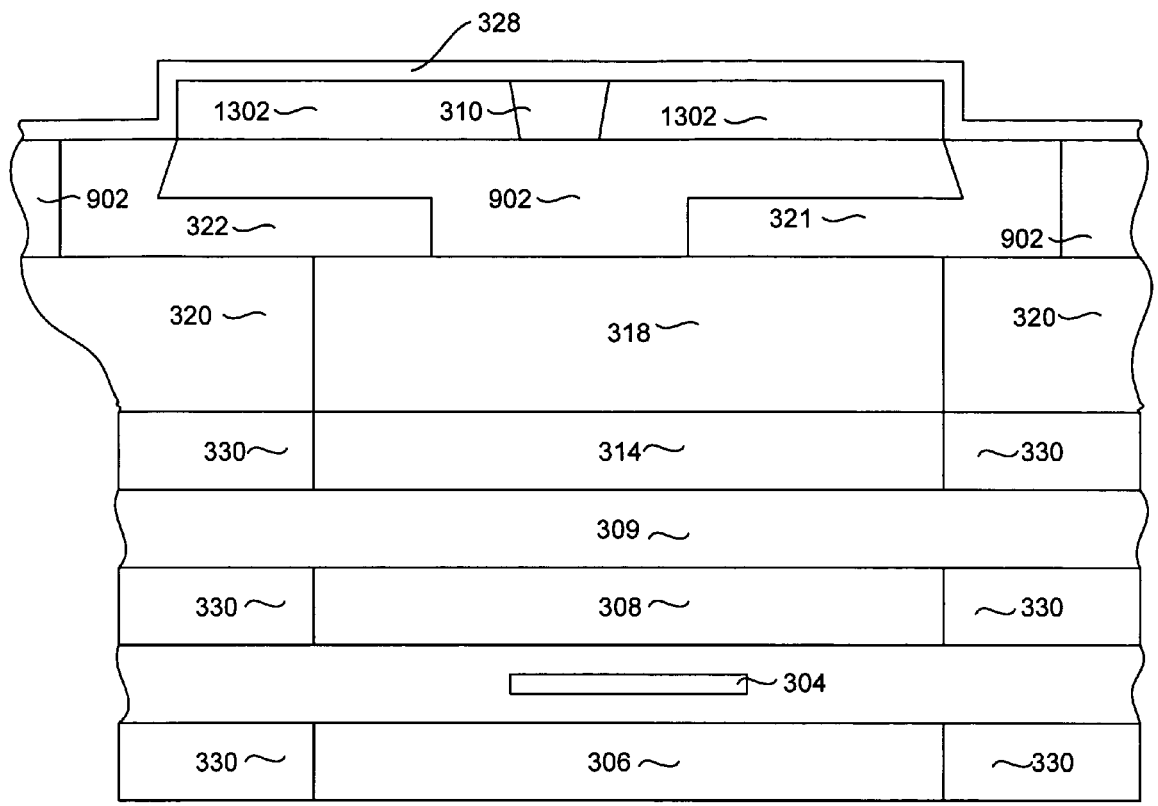

With reference to FIG. 14, the remaining hard mask 1202 (FIG. 12) is removed, such as by a reactive ion etch RIE, and a non-magnetic, electrically conductive seed layer 328 is deposited. The seed layer 328 can be constructed of, for example, Rh and has a thickness that will define the trailing shield gap height. The seed layer 328 is advantageously deposited over a smooth planar surface in the area over and around the write pole 310, which allows for improved thickness (ie. gap) control.

Figure 15:
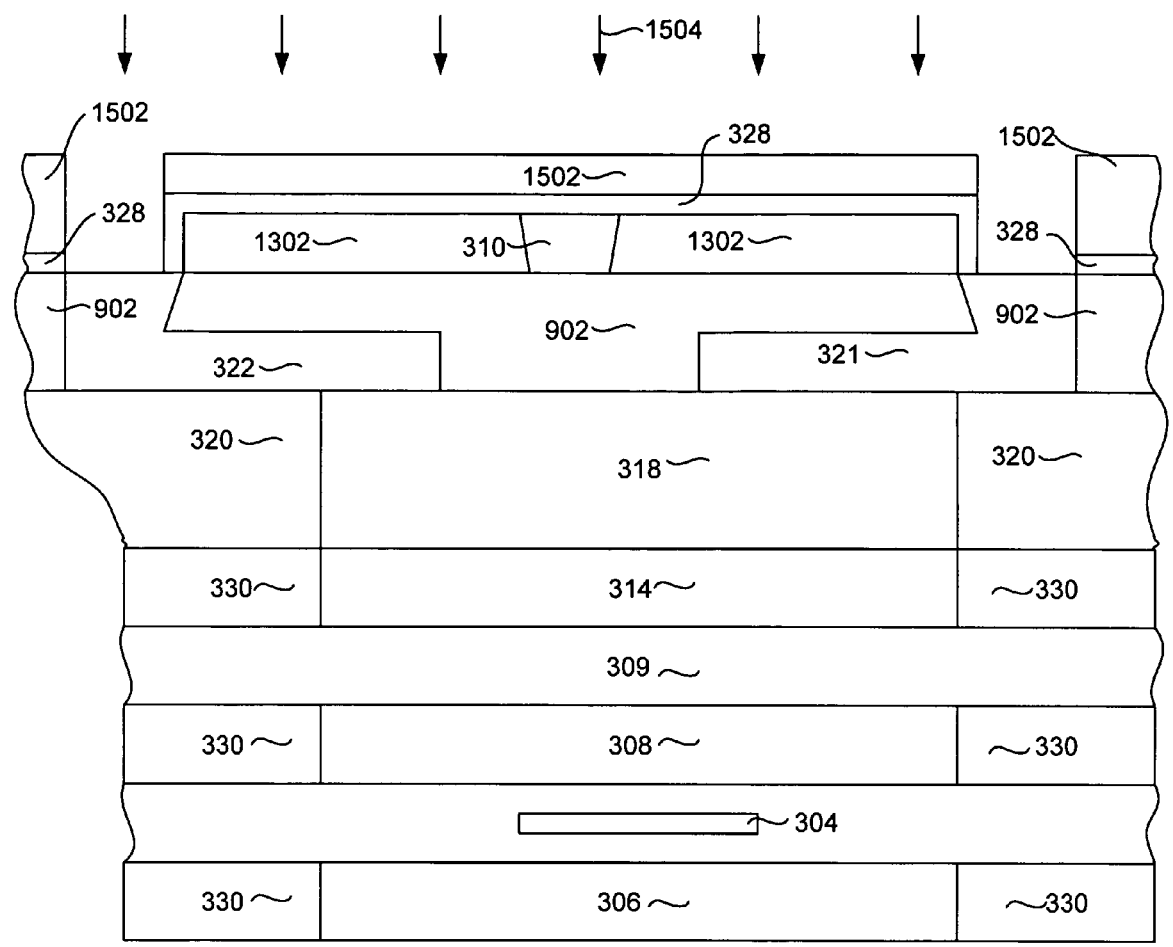

With reference now to FIG. 15, another photoresist mask 1502 is constructed. The photoresist mask 1502 has openings formed over the raised outer portions 1308, 1310 of the first and second stud portions 321, 322. Another ion milling process 1504 is then performed to expose the tops of the raised outer portions 1308, 1310 of the studs 321, 322 and to also expose alignment marks (not shown).

Figure 16:
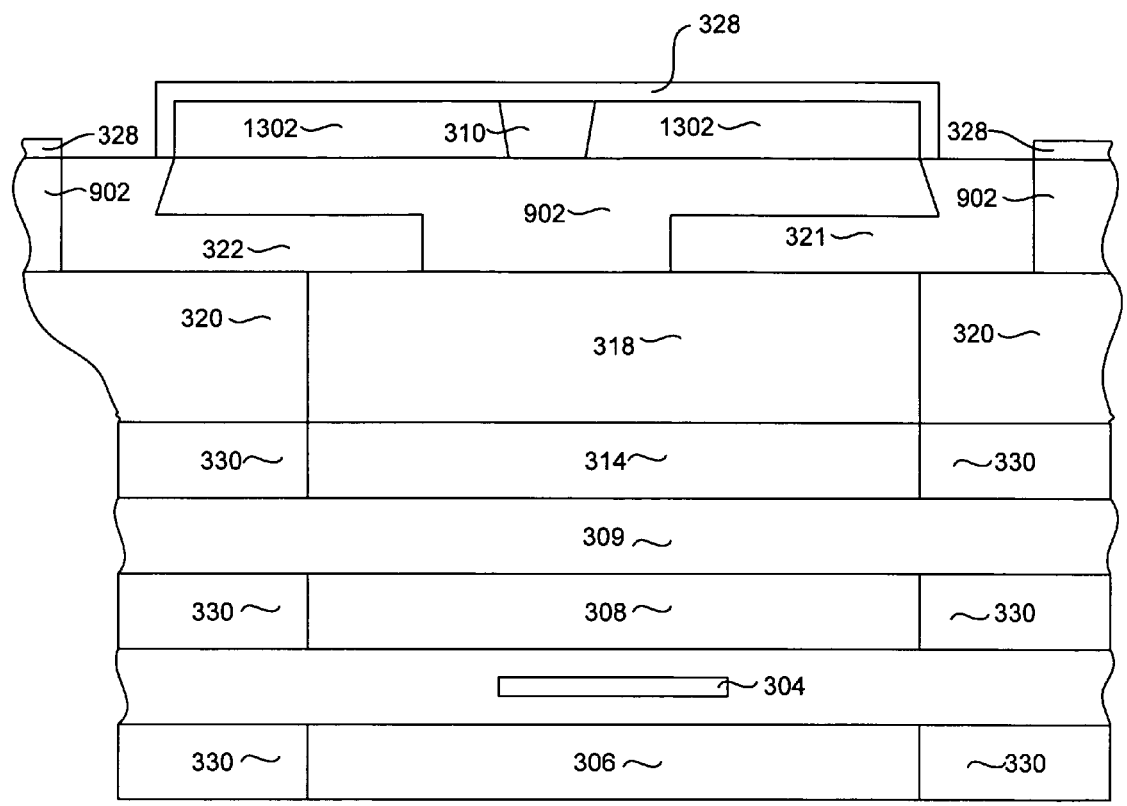
Figure 17:
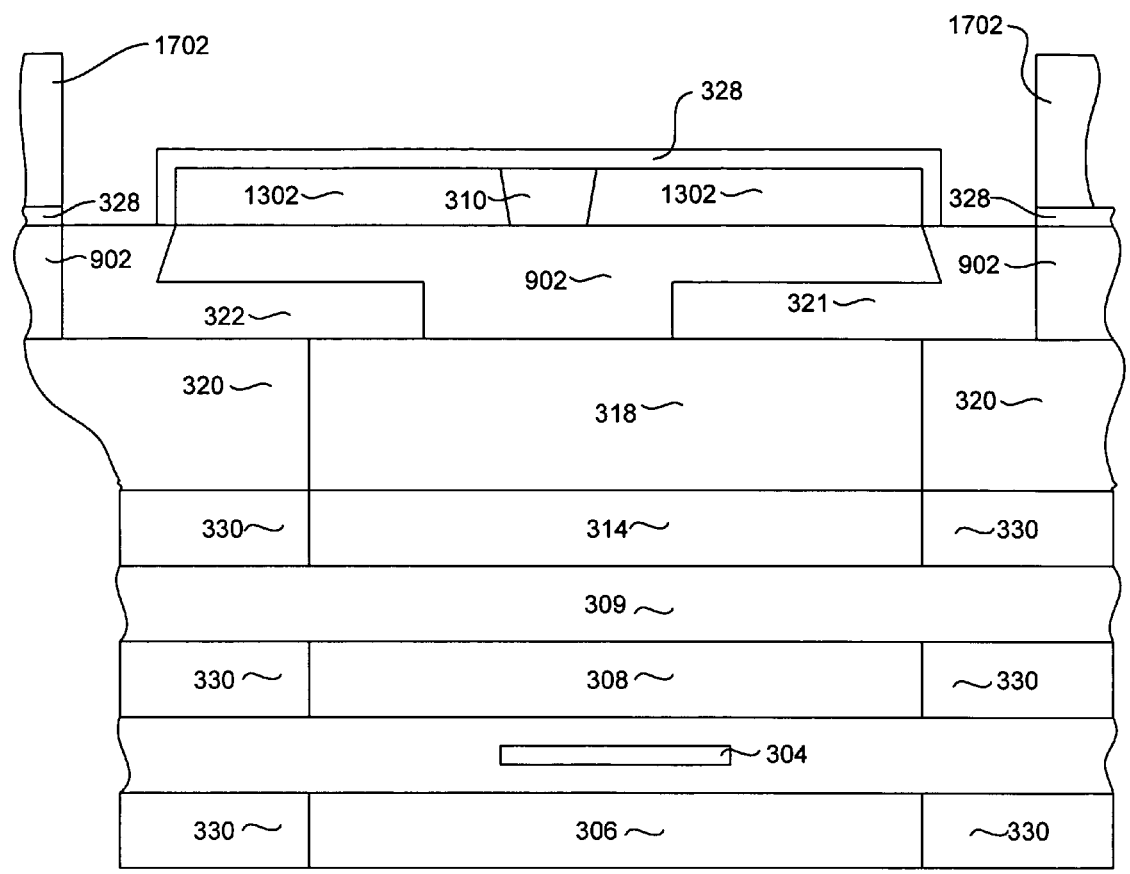
Figure 18:
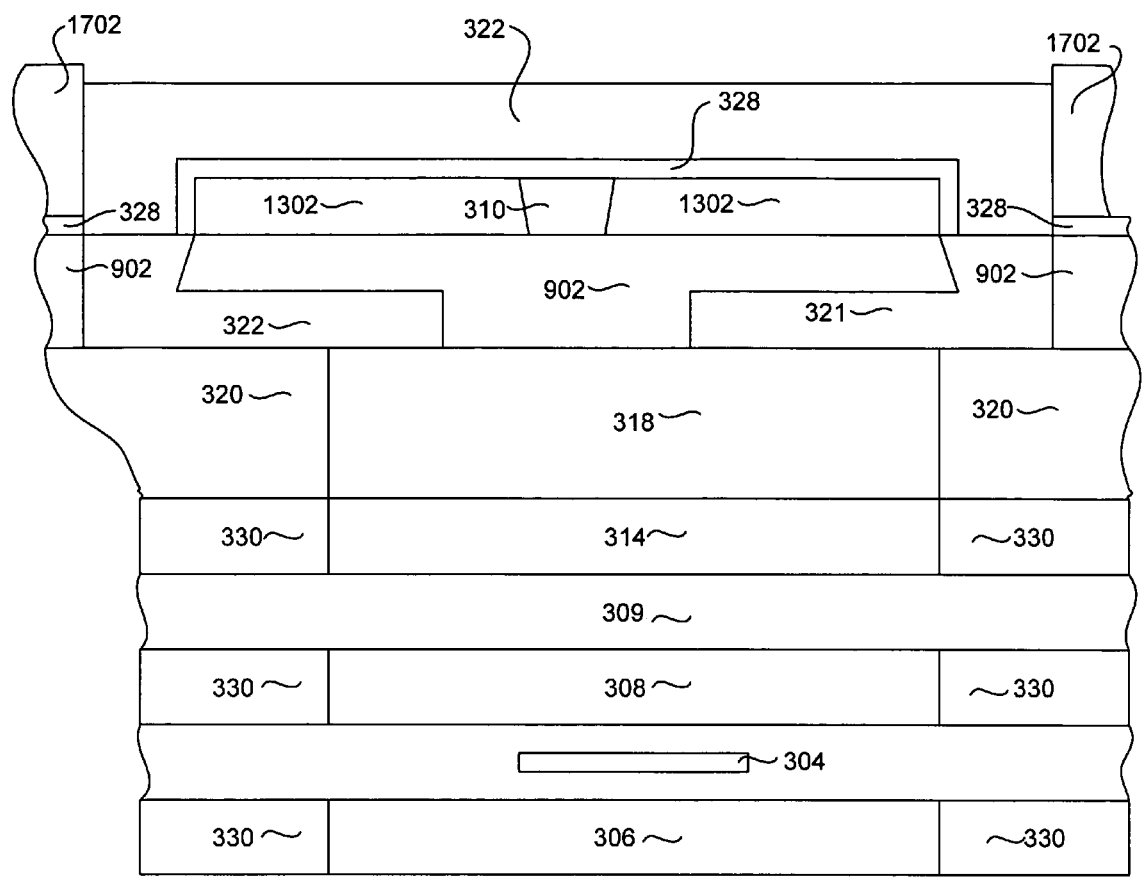

With reference to FIG. 16, the previously formed mask 1502 is removed. Then, with reference to FIG. 17 another photoresist mask 1702 is formed. The mask 1702 is constructed with an opening exposing the areas over the raised outer portions 1308, 1310 of the studs 321, 322 and also to expose the area therebetween where the trailing shield will be formed. With reference to FIG. 18, a magnetic material, such as NiFe can then be deposited, such as by electroplating, to form the third and fourth studs 324, 326 and the trailing shield 322. Further head construction may continue according to methods familiar to those skilled in the art and may include the deposition of an insulation layer (not shown).

Figure 19:
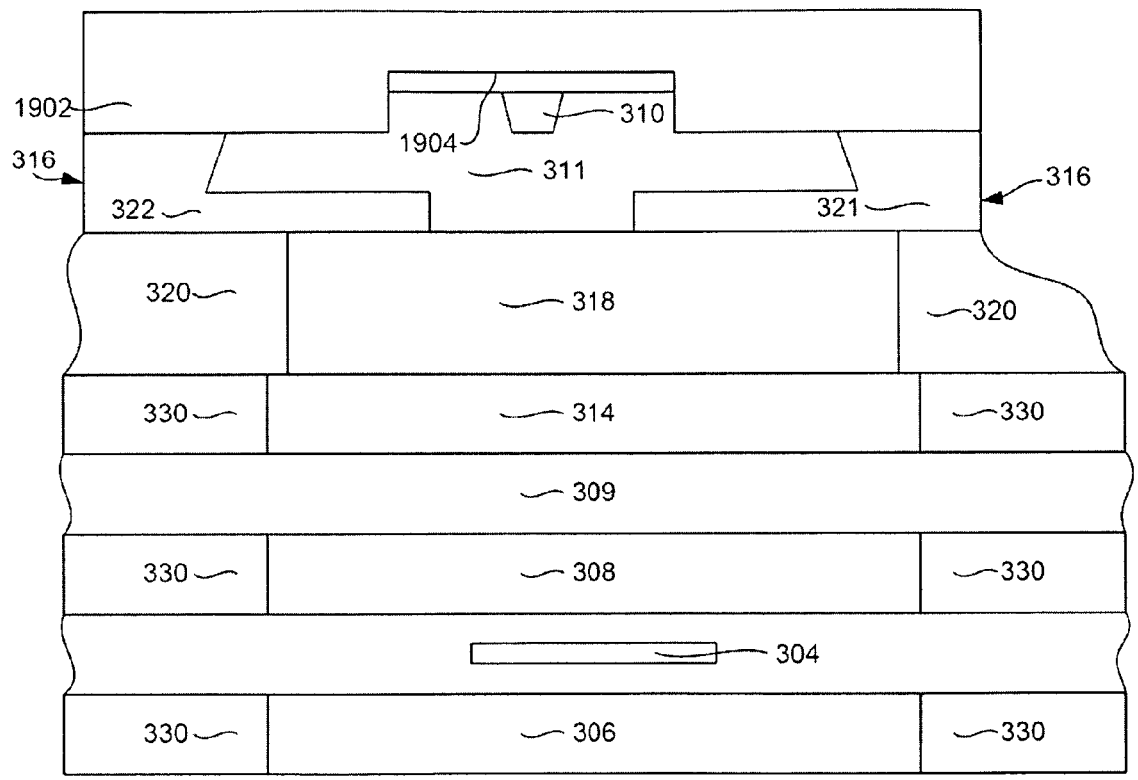
FIG. 19 is an ABS view of an alternate embodiment of the present invention.

With reference now To FIG. 19, in an alternate embodiment of the invention, a draped trailing shield 1902 may be provided, to offer additional shielding protection. The draped trailing shield has an undraped portion 1904 that extends downward to a level above the top surface of the write pole 310. This undraped portion is centrally disposed on the trailing shield, being located in the area of the write pole 310 and being separated from the write pole 310 by a write gap layer/seed layer. The draped trailing shield 1902 also has laterally opposed, downward extending, draped portions, which may extend down to level between the top and bottom layers of the write pole 310 or may extend below the level of the bottom of the write pole 310. This downward draped configuration of the draped trailing shield 1902 provides additional side shielding, when such shielding is necessary.

While various embodiments have been described, it should be understood that they have been presented by way of example only, and not limitation. Other embodiments falling within the scope of the invention may also become apparent to those skilled in the art. Thus, the breadth and scope of the invention should not be limited by any of the above-described exemplary embodiments, but should be defined only in accordance with the following claims and their equivalents.

What is claimed is:

1. A write head for perpendicular magnetic recording, comprising:
a return pole constructed of a magnetic material and having an end disposed toward an air bearing surface;
a write pole constructed of a magnetic material having a surface disposed toward the air bearing surface, the write pole being magnetically connected with the return pole;
a magnetic pedestal; connected with the return pole at the end of the return pole that is disposed toward the air bearing surface, the magnetic pedestal extending toward the write pole;
first and second laterally opposed magnetic studs extending from and contacting an edge of the pedestal closest to the write pole; and
a trailing magnetic shield extending between the first and second studs, and being magnetically connected with the first and second studs, the trailing shield being separated from the write pole by a non-magnetic gap layer; wherein
a portion of each of the first and second studs is formed with a notch; and
each of the first and second magnetic studs has an inner end that faces the other magnetic stud, and wherein the notch is formed at the inner end of each magnetic stud resulting in a laterally inward disposed notch portion and a laterally outward disposed upward extending portion formed on each of the first and second magnetic studs.

2. A write head as in claim 1, wherein the non-magnetic gap layer is electrically conductive.

3. A write head as in claim 1, wherein the gap layer comprises Rh.

4. A write head for perpendicular magnetic recording comprising:
a return pole constructed of a magnetic material and having an end disposed toward an air bearing surface;
a write pole constructed of a magnetic material having a surface disposed toward the air bearing surface, the write pole being magnetically connected with the return pole;
a magnetic pedestal; connected with the return pole at the end of the return pole that is disposed toward the air bearing surface, the magnetic pedestal extending toward the write pole;
first and second laterally opposed magnetic studs extending from and contacting an edge of the pedestal closest to the write pole;
a trailing magnetic shield extending between the first and second studs, and being magnetically connected with the first and second studs, the trailing shield being separated from the write pole by a non-magnetic gap layer; and
a shaping layer, having upper and lower surfaces, the shaping layer being magnetically connected with the write pole; and
a back gap, magnetically connecting the shaping layer with the return pole; and
wherein each of the first and second studs includes a first layer having an upper surface that is coplanar with the upper surface of the shaping layer and a lower surface that is coplanar with the lower surface of the shaping layer each of the first and second studs further comprising a second layer formed over the upper surface of the first layer.

5. A write head as in claim 4, wherein the first layer of each stud has a notch formed in its upper surface.

6. A write head as in claim 4, wherein the first layer of each stud has a notch formed in its upper surface, the notching being disposed toward the other stud, and has an upward extending portion that is disposed away from the other stud, the second layer of each stud being magnetically connected with the upward extending portion of the first layer.

7. A write head as in claim 4, wherein the trailing shield is NiFe, deposited by electroplating.

8. A write head for perpendicular magnetic recording comprising:
a return pole constructed of a magnetic material and having an end disposed toward an air bearing surface;
a write pole constructed of a magnetic material having a surface disposed toward the air bearing surface, the write pole being magnetically connected with the return pole;
a magnetic pedestal; connected with the return pole at the end of the return pole that is disposed toward the air bearing surface, the magnetic pedestal extending toward the write pole;
first and second laterally opposed magnetic studs extending from and contacting an edge of the pedestal closest to the write pole;
a trailing magnetic shield extending between the first and second studs, and being magnetically connected with the first and second studs, the trailing shield being separated from the write pole by a non-magnetic gap layer; and
a read sensor, and wherein:
the pedestal is laterally aligned with the read sensor, and
the studs, write pole and trailing shield are laterally aligned with one another and laterally out of alignment with the read sensor and the pedestal.

* * * * *